(12) United States Patent
Beilmann et al.

(10) Patent No.: US 8,041,671 B2
(45) Date of Patent: Oct. 18, 2011

(54) METHOD AND SYSTEM FOR PROVIDING A HOMOGENEOUS VIEW OF A DISTRIBUTED COMMON INFORMATION MODEL (CIM) WITHIN A HETEROGENEOUS VIRTUAL SYSTEM ENVIRONMENT

(75) Inventors: Arnold Beilmann, Heidelberg (DE); Patrick Hartman, Dossenheim (DE); Wolfgang Reichert, Weil im Schonbuch (DE)

(73) Assignee: International Business Machines Corporation, Armonk, NY (US)

(*) Notice: Subject to any disclaimer, the term of this patent is extended or adjusted under 35 U.S.C. 154(b) by 466 days.

(21) Appl. No.: 12/202,471

(22) Filed: Sep. 2, 2008

(65) Prior Publication Data
US 2010/0058339 A1 Mar. 4, 2010

(51) Int. Cl.
*G06F 7/00* (2006.01)
(52) U.S. Cl. .................. 707/609; 707/770; 707/821
(58) Field of Classification Search .......... 707/609, 707/770, 821; 709/217
See application file for complete search history.

(56) References Cited

U.S. PATENT DOCUMENTS

2004/0128669 A1* 7/2004 Furst et al. .................. 717/178
2005/0004974 A1* 1/2005 Sharma et al. ............... 709/202
2007/0073877 A1   3/2007 Boykin et al.

OTHER PUBLICATIONS

Distributed Management Task Force, Inc., Common Information Model (CIM) Standards, Copyright 2008, retrieved Jun. 25, 2008, from http://www.dmtf.org/standards/cim/, 2 pages.

* cited by examiner

*Primary Examiner* — Shahid Alam
*Assistant Examiner* — Fazlul Quader
(74) *Attorney, Agent, or Firm* — Cantor Colburn LLP; Dennis Jung (57) ABSTRACT

A method and system for providing a homogeneous view of a distributed common information model (CIM) within a heterogeneous virtual system environment is disclosed. The virtual system environment includes local and remote host systems, each of which includes a CIM Object Model (CIMOM) and a CIM repository of provider applications. The method includes selecting one of the CIMOMs to serve as a single access point to the CIMOMs for all client requests and configuring provider applications of the selected CIMOM to communicate with non-selected CIMOMs. The configuration includes using a discovery or registration process to identify all of the local and remote host systems in the virtual system environment and provide access points between the provider applications of the selected CIMOM and the hosts. In response to a client request, the selected CIMOM uses the access points to retrieve, aggregate, and forward the information to a client application as a homogeneous view.

15 Claims, 6 Drawing Sheets

METHOD AND SYSTEM FOR PROVIDING A HOMOGENEOUS VIEW OF A DISTRIBUTED COMMON INFORMATION MODEL (CIM) WITHIN A HETEROGENEOUS VIRTUAL SYSTEM ENVIRONMENT

BACKGROUND

The present invention relates to data processing, and more specifically, to a method and system for providing a homogeneous view of a distributed common information model (CIM) within a heterogeneous virtual system environment.

Computer system management requires information about computer components and network components, the state of each of those items, and their relationships. This information may include discovery of networks, network paths, computers, operating systems, file systems, installed applications and application components, user transactions, and other information. An open standard called Common Information Model (CIM) was developed for managing these items. The CIM model defines representations of managed elements in an IT environment (and relationships between them) as a common set of objects. These representations seek to provide consistent management of these managed elements, independent of their manufacturer or provider. The use of CIM allows multiple parties to exchange management information about these managed elements. CIM not only represents these managed elements and the management information, but also provides a means to actively control these elements. By using a common model of information, management software can be written once and work with many implementations of the common model without complex and costly conversion operations or loss of information.

In a computer landscape with more than one CIM repository available, each CIM repository contains CIM providers, which procure its own computer system-specific information and provide this information to consumers (e.g., end users) via a CIM client. The current method for a CIM client to obtain information across CIM repositories is to separately connect to each repository. The repository discovery is done either by using Service Location Protocol (SLP, which is a service discovery protocol allowing computers and other devices to find services in a local area network without prior configuration), or by referencing other repositories from a single CIM repository. There is currently no way to gather cross-repository information from a single centralized repository.

Commonly assigned U.S. Patent Publication No. 2007/0073877 entitled, "Method and System for Unified Support of Multiple System Management Information Models in a Multiple Host Environment," filed on Aug. 25, 2005 describes a method and system for employing CIM resources within a data processing system. A request is received for an operation with respect to CIM resources, and a determination is made as to whether the request can be fulfilled locally or remotely. In response to a determination to fulfill the request locally, the request is delegated to local CIM Object Manager (CIMOM) functionality to obtain resulting data, e.g., from a local repository or from a locally managed provider. In response to a determination to fulfill the request remotely, the request is delegated to one or more remote CIMOMs, and the resultant data is aggregated from a plurality of remote CIMOMs. The logic that determines whether the request is a local or a remote one is implemented as the part of the CIMOM itself. This requires modifications of the CIMOM implementations.

It would be advantageous to provide a means for gathering cross-repository information from a single centralized repository without changing the CIMOM implementation.

SUMMARY

According to one embodiment of the present invention, a method for providing a homogeneous view of a distributed common information model (CIM) within a heterogeneous virtual system environment is disclosed. The virtual system environment includes local and remote host systems, each of which includes a CIM Object Model (CIMOM) and a CIM repository of provider applications. The method includes selecting one of the CIMOMs to serve as a single access point to the CIMOMs for all client requests and configuring provider applications of the selected CIMOM to communicate with non-selected CIMOMs. The configuration includes using a discovery or registration process to identify all of the local and remote host systems in the virtual system environment and provide access points between the provider applications of the selected CIMOM and the hosts. In response to a client request, the selected CIMOM uses the access points to retrieve, aggregate, and forward the information to a client application as a homogeneous view.

In another embodiment, a method for providing a homogeneous view of a distributed common information model (CIM) within a heterogeneous virtual system environment is disclosed. The virtual system environment includes local and remote host systems, each of which includes a CIM Object Model (CIMOM) and a CIM repository of provider applications. The method includes using an arbitrary CIMOM of one of the host systems to serve as a single access point to the CIMOMs for all client requests, and configuring provider applications of the single access point CIMOMs to communicate with other CIMOMs. The configuration includes using a discovery process to identify all of the local and remote host systems in the virtual system environment, identifying those of the discovered local and remote host systems that are logically related, and providing access points between the provider applications of the single access point CIMOMs and the logically related local and remote hosts. In response to a client request, the single access point CIMOM uses the access points to the logically related local and remote host systems to retrieve, aggregate, and forward the information to a client application as a homogeneous view.

In a further embodiment, a system for providing a homogeneous view of a distributed common information model (CIM) within a heterogeneous virtual system environment is disclosed. The virtual system environment includes local and remote host systems, each of which includes a CIM Object Model (CIMOM) and a CIM repository of provider applications. The system includes a CIMOM selected from the local and remote host systems to serve as a single access point to the plurality of CIMOMs within the virtual system environment for all client requests. The system also includes provider applications of the selected CIMOM configured to communicate with non-selected CIMOMs in the virtual system environment. The configuration includes using a discovery or registration process to identify all of the local and remote host systems in the virtual system environment and provide access points between the provider applications of the selected CIMOM and the hosts. In response to a client request, the selected CIMOM uses the access points to retrieve, aggregate, and forward the information to a client application as a homogeneous view.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments provide a solution for aggregating management information from different Common Information Model (CIM) data sources (e.g., repositories). The solution provides an aggregated data view within the layer of a CIM Object Model (CIMOM) via a centralized CIM aggregator. The centralized CIM aggregator includes a CIM provider, and the data it provides is available within the CIM repository itself via access points to remote CIMOMs. In an exemplary embodiment, the access points to the remote CIM repositories are also CIM providers.

Figures 1, 1B:
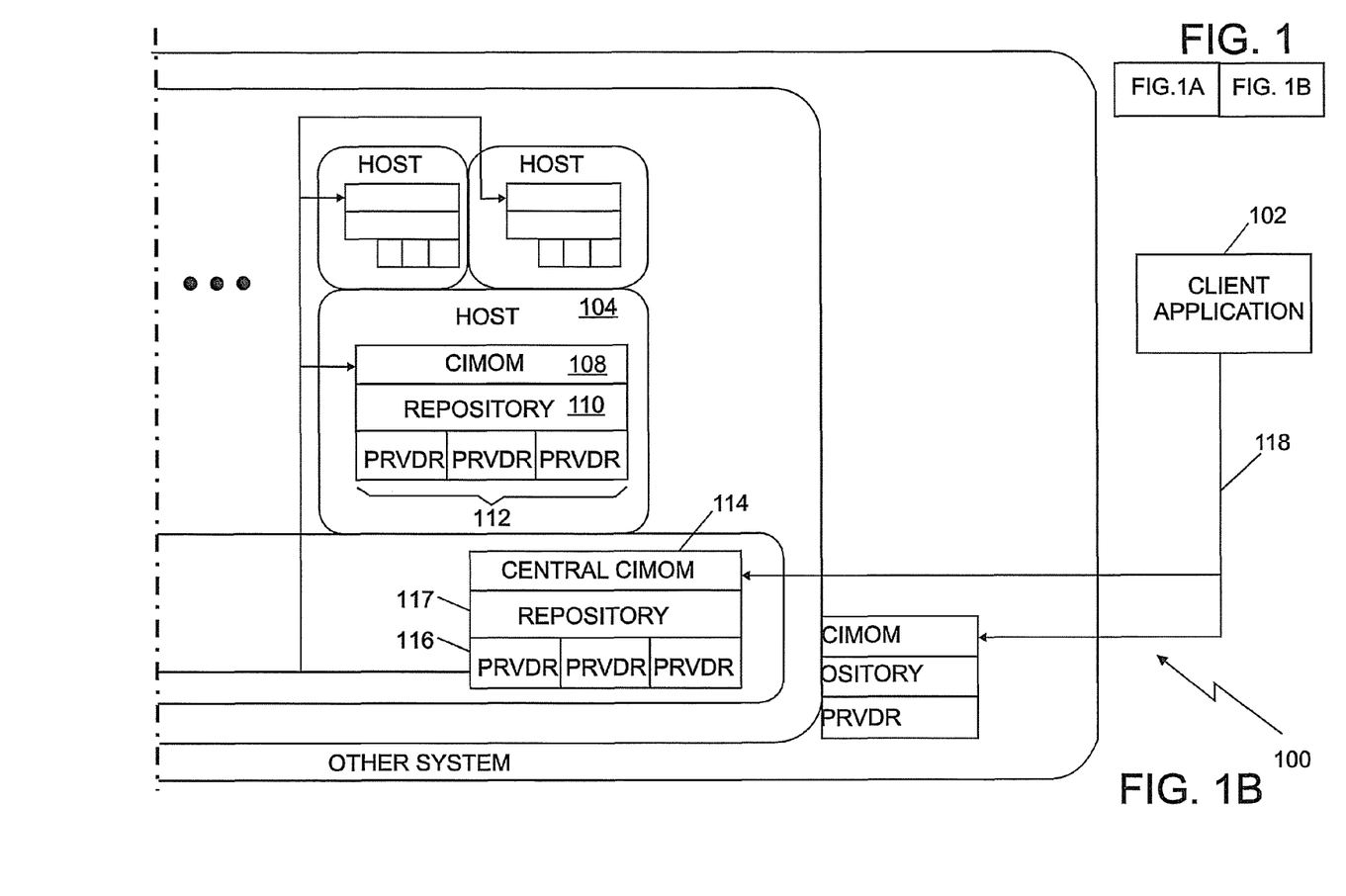
FIGS. 1A-1B illustrate a block diagram of a system upon which centralized CIM aggregation processes may be implemented in an exemplary embodiment.
Figure 1A:
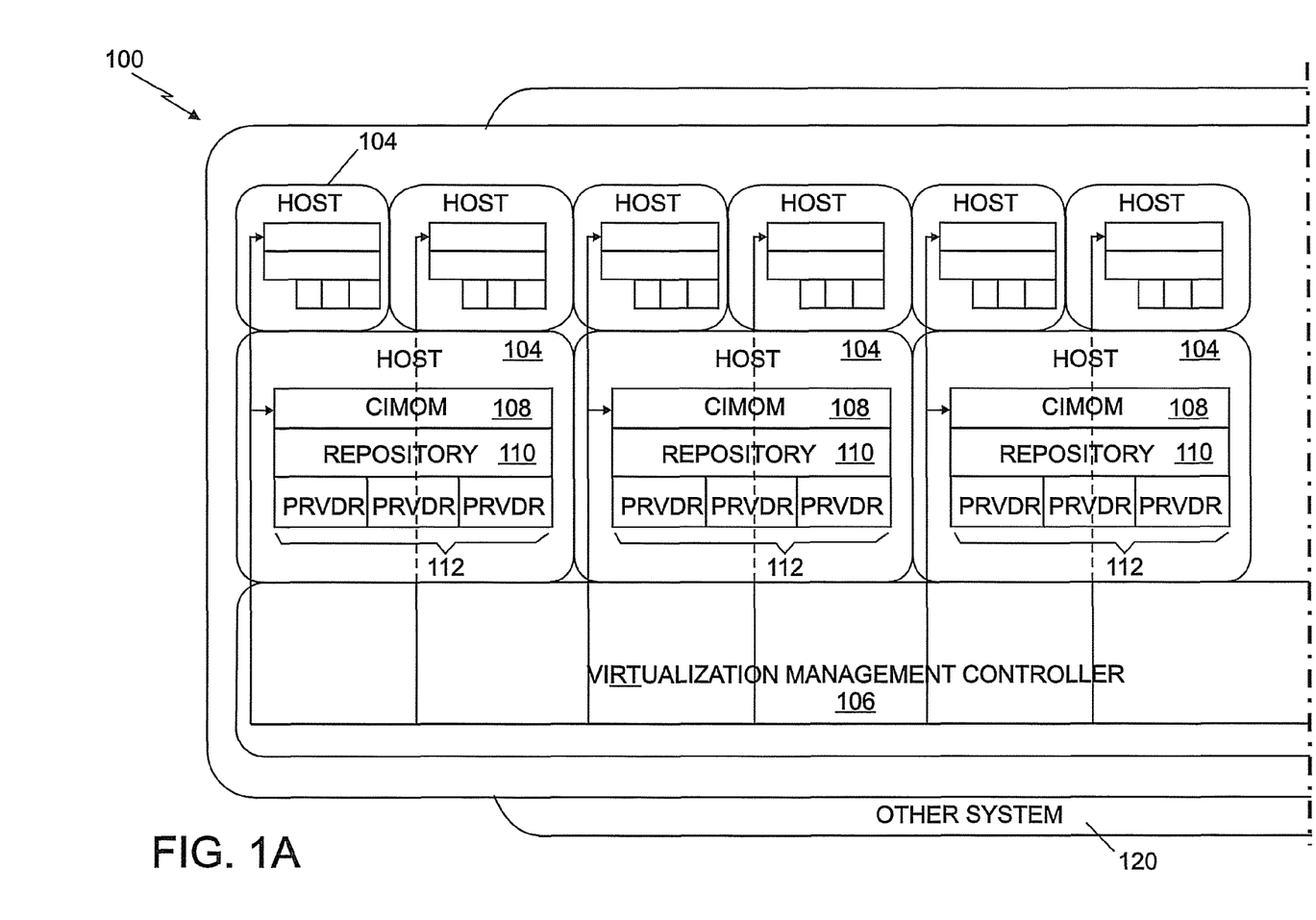

With reference now to FIGS. 1A-1B, an exemplary system 100 for implementing the centralized CIM aggregator will now be described. In an exemplary embodiment, the system 100 of FIG. 1 is a virtual system environment that includes a set of host systems 104 and a virtual management controller 106, each of which has its own CIM Object Manager 108 and 114, respectively. The hosts 104 are heterogeneous enterprise systems and elements. The virtual management controller 106 may be an element or a separate system that is used for management of the host systems 104 in a virtual system environment 100. Although the exemplary embodiments may be implemented in view of other system management model specifications, the present invention is described herein with respect to CIM specifications. The CIM specifications represent computational resources that constitute a data processing environment and the relationships between those computational resources. The CIM standards and specifications, which are driven by the Distributed Management Task Force, Inc., (DMTF) support a management infrastructure. The CIM specifications may be found in Common Information Model (CIM) specification, Version 2.18.1, Jun. 20, 2008 promulgated by DMTF.

In addition and closely related to the CIMOMs 108 and 114, each of the host systems 104 and the virtualization management controller 106 contains a CIM repository 110/117 and CIM providers 112/116, respectively. The CIMOMs 108 represent a server-side of a client-server architecture. Each of the CIMOMs 108 transfers information between client applications 102, CIM repositories 110, and provider applications 112. The CIM repository 110 stores and retrieves static information as well as the access points to provider applications 112. The provider applications 112 provide access to management and monitoring methods of the host system 104.

In a traditional, non-virtualized environment, a CIMOM runs on each physical system. This CIMOM provides all the resource information about the physical computer system as well as the operating system. In a virtualized environment, there are multiple layers of systems each hosting its own CIMOM. In general, each CIMOM has only the knowledge about its virtualization layer and, if at all, associators referring to the hosted systems. The number of host systems in a virtual system environment may range in the hundreds or even thousands. The client would need to connect to, and authenticate with, every host's CIMOM.

One advantage of the exemplary embodiment shown in FIG. 1 is that the central CIMOM 114 knows and manages the physical systems through the virtualization management controller 106. Furthermore, the central CIMOM 114 includes special provider applications 116, which locate all hosted virtual systems 104 in the virtual system environment 100 and connects to their CIMOMs 108.

In an exemplary embodiment, a CIMOM 114 is selected and configured to enable a single point of access 118 for communication between the client application 102 and all CIMOMs 108 within virtual system environment 100. Within a complex computer system environment there might be additional virtual system environments, which is illustrated in FIG. 1 as OTHER SYSTEM 120. These other systems include their own set of host systems, which are managed through other virtualization management controllers. The selected CIMOM 114 (also referred to herein as 'central node' or 'central CIMOM') receives all client application requests and finds the location of the requested information in the virtual system environment 100 through one of the provider application 116 that handles remote CIMOMs. This special provider application 116 aggregates the information (if retrieved from multiple different host systems 104), and returns it to the CIMOM 114, which then forwards it as a single, homogenous view to the client application 102.

Figures 2, 2A:
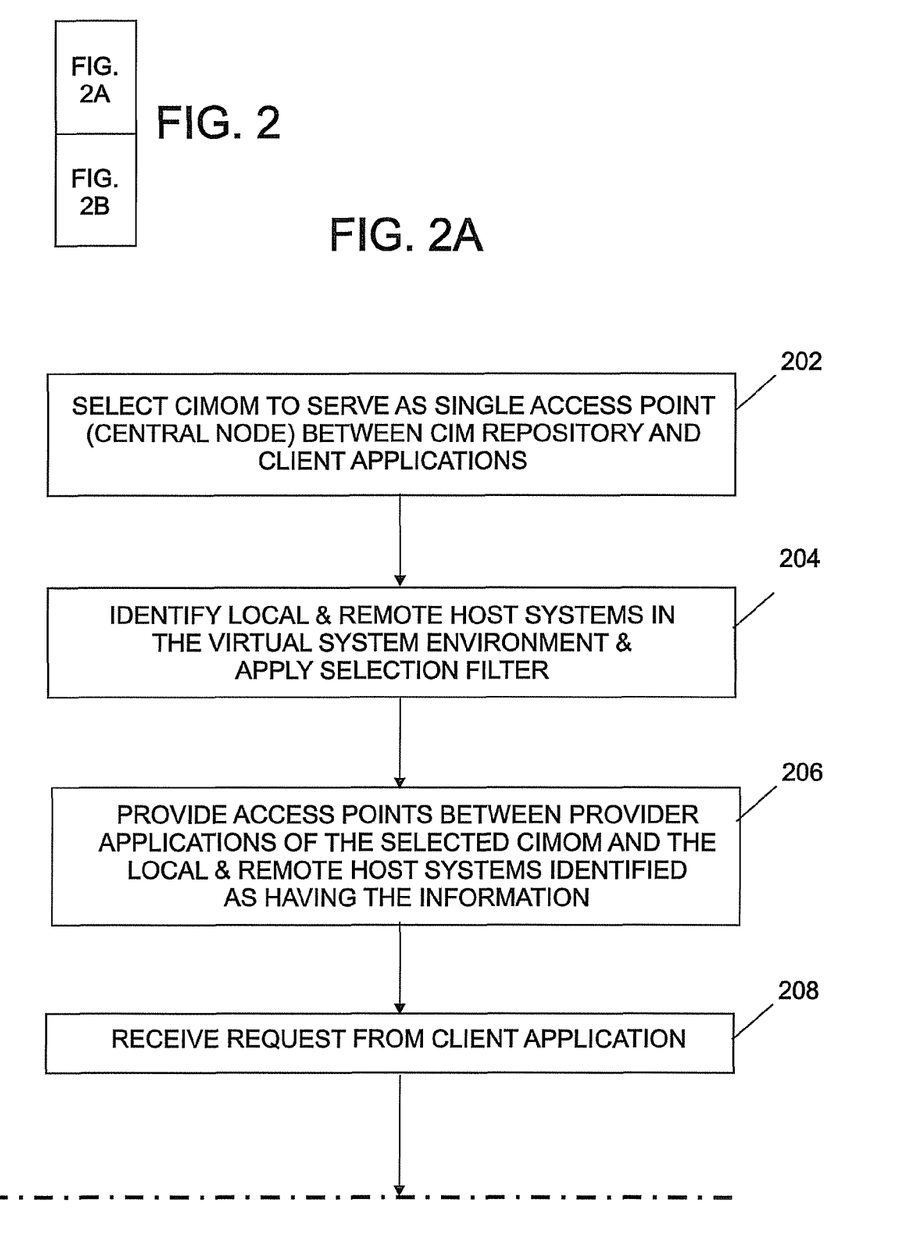
FIGS. 2A-2B illustrate a flow diagram describing a process for implementing a centralized CIM aggregator via the system of FIG. 1 in accordance with an exemplary embodiment.
Figure 2B:
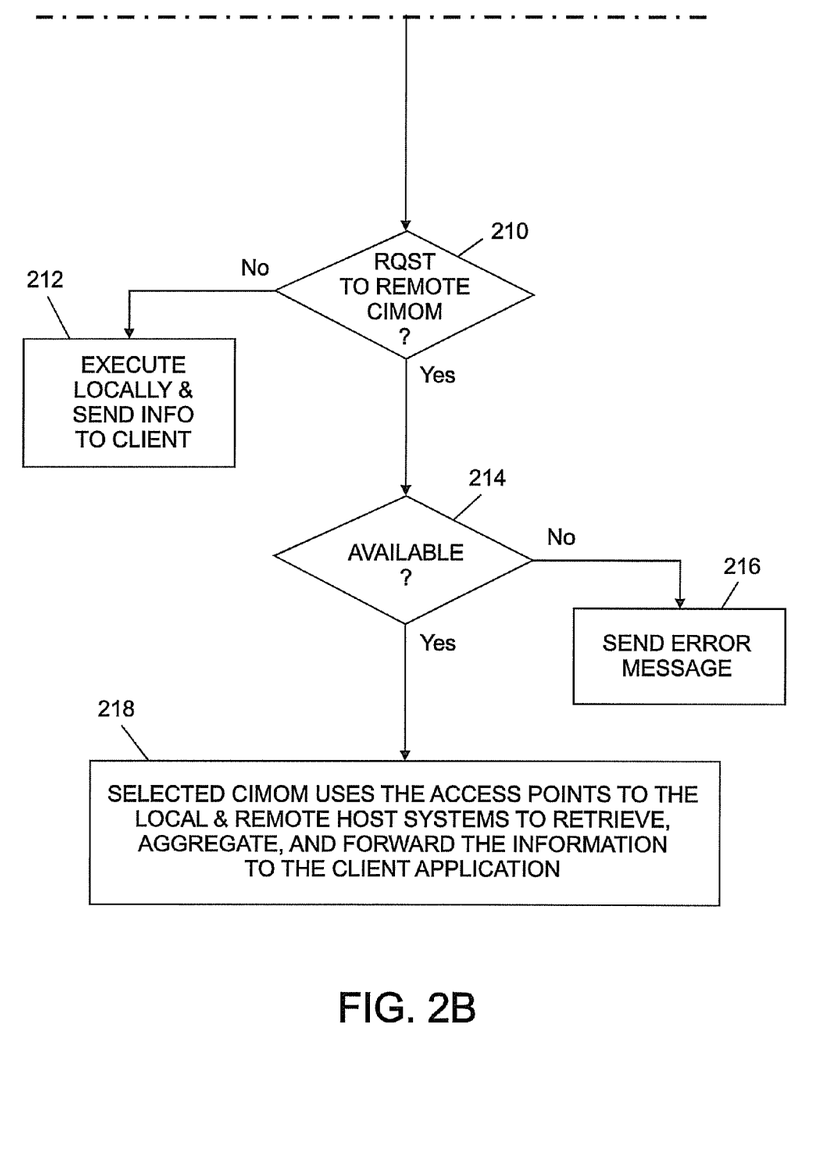

Turning now to FIGS. 2A-2B, an exemplary process for implementing the CIM aggregation processes via the system of FIG. 1 will now be described. At step 202, a CIMOM 108 is selected to serve as a central CIMOM 114. When the CIMOM has been selected, special provider applications 116 on this CIMOM 114 are configured to dynamically add remote CIMOMs 108 through a process using, e.g., discovery or registration as described herein.

At step 204, the provider applications 116 identify local and remote host systems in the virtual system environment 100. The local host is the host the CIMOM runs on or is directly attached to (for example, for CIMOM 114, the local host is 106). The identification of remote hosts and their CIMOMs can be done using a discovery process or a registration process. For example, using a discovery process, the special providers 116 within the central CIMOM 114 use a given filter within a subnet of the CIMOM 114 to search for remote CIMOMs. The filter might be configured to accept only remote CIMOMs which are on the same physical host or which belong to the same virtual system environment or are logically related elsewhere. Alternative to the discovery process, the special providers 116 of the central CIMOM 114 may receive a request from a remote CIMOM to register itself within a repository 117 of the central CIMOM 114. Once the remote CIMOMs are found, either by discovery or registration, they are accessible by client application 102 through the central CIMOM 114.

At step 206, once discovery or registration has been executed, the provider applications 116 of the central CIMOM 114 add access points to available provider applications 112 on the remote CIMOM 108. The added access points are the new CIM namespaces (one for each registered system) and CIM classes within these namespaces, whereby these classes do not contain any provider logic; instead, the request is delegated to the corresponding class on the remote host 104.

When steps 204 and 206 are completed, the central CIMOM 114 is ready to handle client requests affecting remote hosts 104 from the client application 102 (via link 118). At step 208, the central CIMOM 114 receives a request from a client application 102.

At step 210 it is determined whether the request is for a remote CIMOM 108. If not (i.e., the request is to the local CIMOM), the request is executed locally and the information is forwarded to the client application 102 at step 212. If however, the request is for a remote CIMOM 108, it is then determined whether the remote CIMOM 108 and required providers 112 are available at step 214. If not, an error message is returned to the client application 102 at step 216. Otherwise, the central CIMOM 114 uses the access points to the local and remote host systems 104 identified as having the requested information via the filter to retrieve, aggregate, and forward the information, as a consolidated homogeneous view, to the client application 102 at step 218.

In addition to the processes described above, the central CIMOM 114 is also configured to periodically check to see if registered/discovered remote CIMOMs are still available. Upon a determination that the registered/discovered remote CIMOMs are no longer available, the central CIMOM 114 is configured to remove the access points to the remote CIMOM.

Figures 3, 3B:
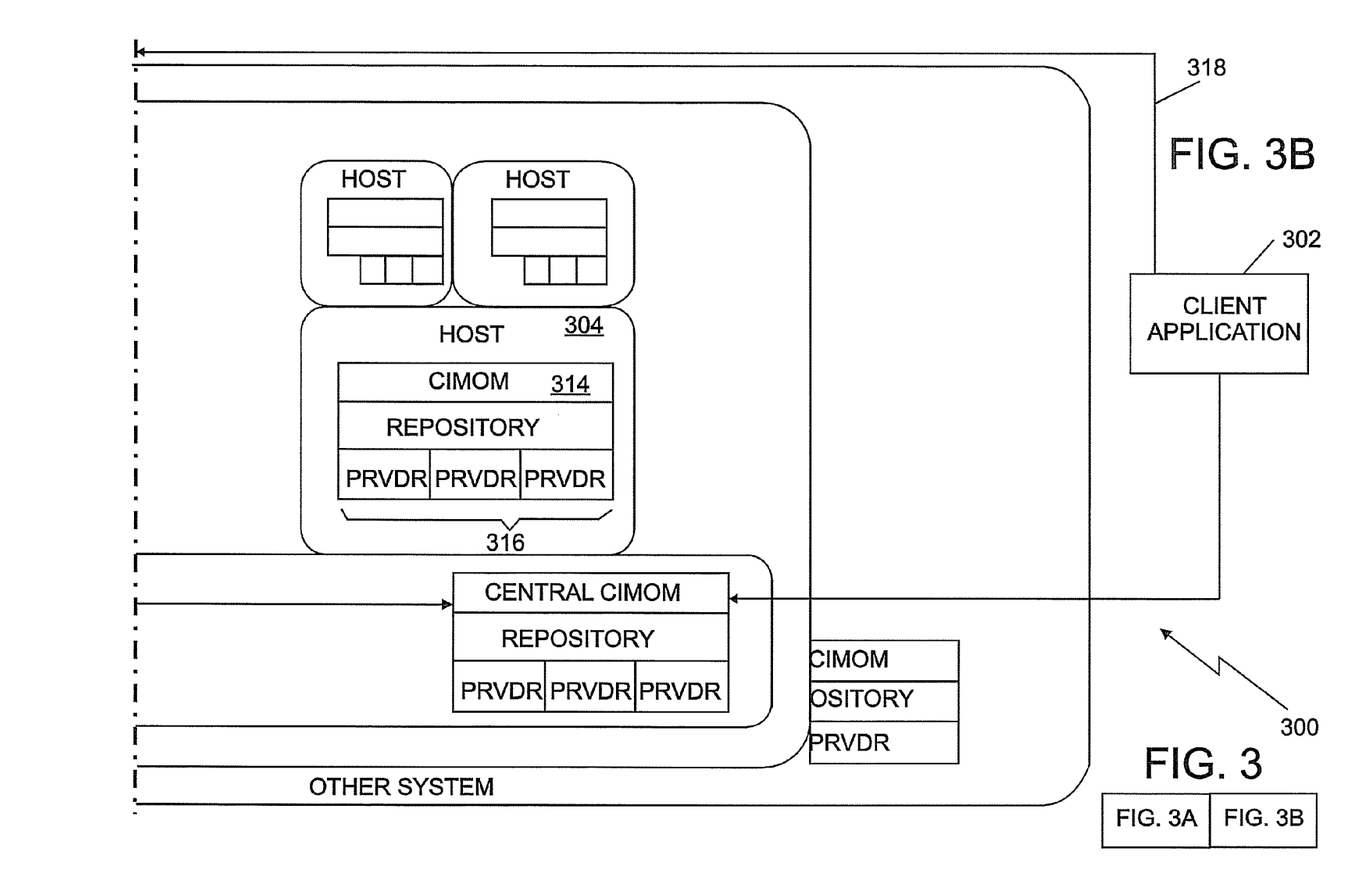
FIGS. 3A-3B illustrate a block diagram of a system upon which CIM aggregation processes may be implemented in an alternative exemplary embodiment.
Figure 3A:
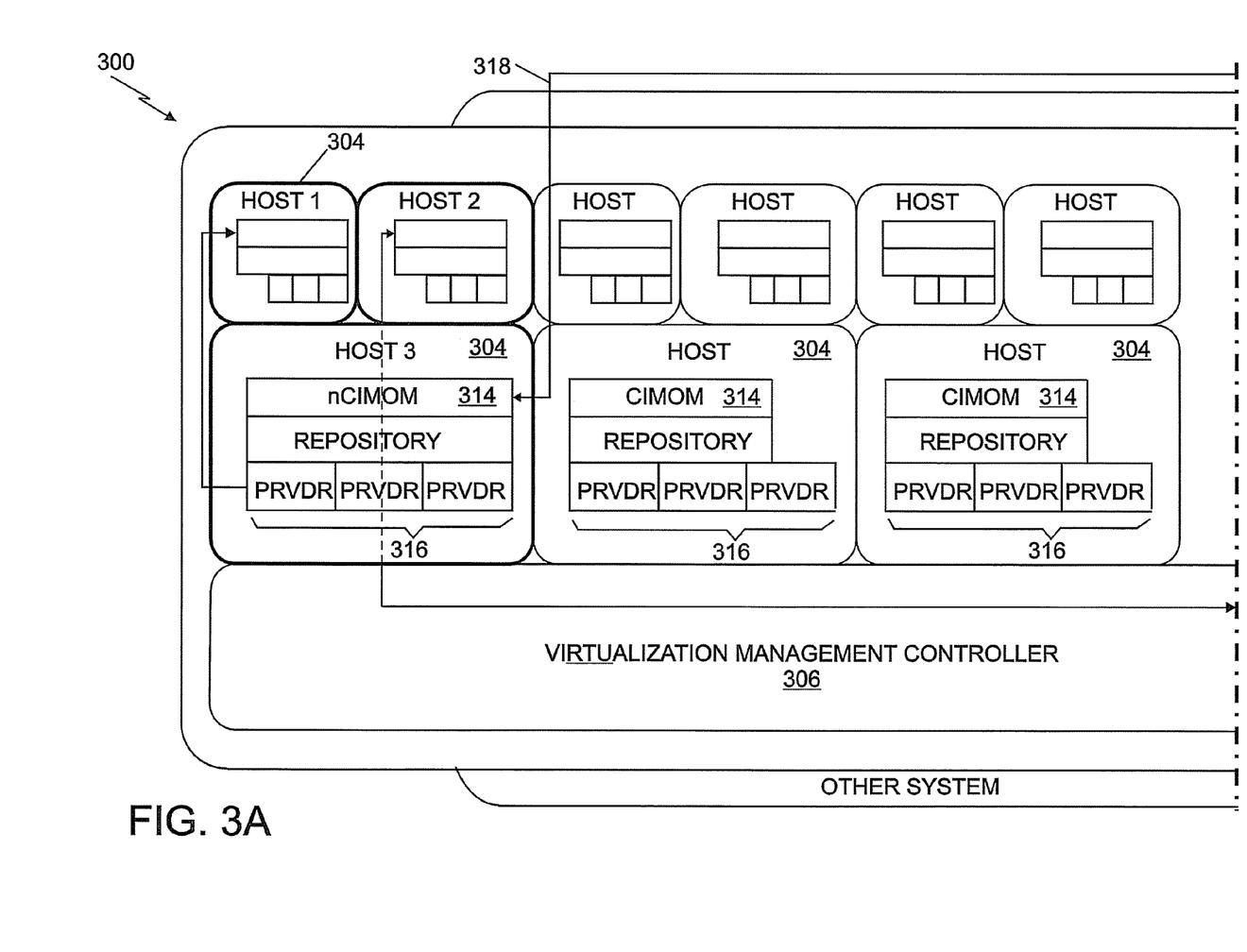

In an alternative exemplary embodiment, CIMOM aggregation processes are described with respect to FIGS. 3A-3B. In this alternative exemplary embodiment, a client application (e.g., client application 302) has a connection 318 to an arbitrary CIMOM (e.g., a CIMOM running on one particular host system 304; shown in FIG. 3B for illustrative purposes as host 3). By using this connection 318, client application 302 gets aggregated information from this host (i.e., host 3) and from all logically related hosts, as described herein.

Turning now to FIGS. 3A-3B, a virtual system environment 300 for implementing an arbitrary CIMOM for performing aggregation of information is shown. The virtual system environment 300 is substantially similar to that depicted in FIG. 1. Thus, only the distinguishing features will be described herein. In the virtual system environment 300 of FIG. 3, all of the CIMOMs 314 have at least one special provider application 316 configured to perform the configuration processes described in steps 202-206 of FIG. 2. Thus, each of the CIMOMs 314 is configured to discover the virtual system environment 300 and identify all of the logically related systems 304 and 306, respectively with the CIMOM 314 through the special provider applications 316. The usage of registration of CIMOMs in the embodiment described herein is not applicable because there is no predefined central aggregation point available (as is true for the central CIMOM 114 in FIG. 1). Likewise, the CIMOMs 314 each are configured to identify dynamically, which of the found systems 304, 306 has providers 316 that the client 302 needs. The configuration includes the availability of the special providers 316. As indicated above, the need can be determined on the basis of logical relations (or CIM associations) between the computer systems. For example, Host3 in FIG. 3 has logical relations only to Virtualization Management Controller 306, Host1, and Host 2, but no logical relations to the other host systems 304. These other host systems 304 may be excluded from the identification process. Each of the configured CIMOMs 314 may perform the processes recited in steps 206-218 of FIG. 2. Further, each of the configured CIMOMs 314 may be configured to periodically check to see if remote CIMOMs are available and remove access points upon determining the remote CIMOMs are no longer available.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a homogeneous view of a distributed common information model (CIM) within a heterogeneous virtual system environment, the virtual system environment includes a plurality of local and remote host systems, a number of the local and remote host systems each comprising a CIM Object Model (CIMOM) and a CIM repository of provider applications, the method comprising:
    selecting one of the CIMOMs to serve as a single access point to the plurality of CIMOMs within the virtual system environment for all client requests, the client requests originating from a plurality of different distributors;
    configuring provider applications of the selected CIMOM to communicate with non-selected CIMOMs in the virtual system environment, the configuring including:
    using at least one of a discovery process and a registration process to identify all of the local and remote host systems in the virtual system environment; and providing access points between the provider applications of the selected CIMOM and the local and remote hosts; and in response to a client request, the selected CIMOM uses the access points to the local and remote host systems to retrieve, aggregate, and forward the information to a client application of the client request as a homogeneous view;

wherein the method further comprising: periodically checking the registered remote CIMOMs for continued availability; and removing the access points to the registered remote CIMOMs upon determining that the registered remote CIMOMs are no longer available.

2. The method of claim 1, wherein the discovery process includes:
using a given filter within a subnet of the selected CIMOM, searching for remote CIMOMs in the virtual system environment; and
registering, at the selected CIMOM, remote CIMOMs found as a result of the searching.

3. The method of claim 1, wherein the registration process includes:
receiving a request from a remote CIMOM in the virtual system environment to register with the selected CIMOM within its subnet; and
registering, at the selected CIMOM, the remote CIMOM associated with the request.

4. The method of claim 3, further comprising:
periodically checking the registered remote CIMOM for continued availability; and
removing the access points to the registered remote CIMOM upon determining that the registered remote CIMOM is no longer available.

5. The method of claim 1, wherein using the access points between the provider applications of the selected CIMOM and the local and remote hosts includes determining whether the client request is for a local CIMOM or a remote CIMOM; wherein client requests for a local CIMOM are executed locally, and client requests for a remote CIMOM are executed using the respective access points.

6. The method of claim 1, wherein:
the access points are newly created CIM namespaces, one namespace for each registered local and remote host system, and CIM classes within the namespaces; and
the client request is delegated to the corresponding class on the remote host system.

7. A method for providing a homogeneous view of a distributed common information model (CIM) within a heterogeneous virtual system environment, the virtual system environment includes a plurality of local and remote host systems, a number of the local and remote host systems each comprising a CIM Object Model (CIMOM) and a CIM repository of provider applications, the method comprising:
using an arbitrary CIMOM of one of the host systems to serve as a single access point to the plurality of CIMOMs within the virtual system environment for all client requests, the client requests originating from a plurality of different distributors;
configuring provider applications of the single access point CIMOMs to communicate with other CIMOMs in the virtual system environment, the configuring including:
using a discovery process to identify all of the local and remote host systems in the virtual system environment; identifying those of the discovered local and remote host systems that are logically related; and providing access points between the provider applications of the single access point CIMOMs and the logically related local and remote hosts; and in response to a client request, the single access point CIMOM uses the access points to the logically related local and remote host systems to retrieve, aggregate, and forward the information to a client application of the client request as a homogeneous view;

wherein the method further comprising: periodically checking the registered remote CIMOMs for continued availability; and removing the access points to the registered remote CIMOMs upon determining that the registered remote CIMOMs are no longer available.

8. The method of claim 7, wherein logical relationships among the discovered local and remote host systems are determined by CIM associations.

9. The method of claim 7, wherein:
the access points are newly created CIM namespaces, one namespace for each registered local and remote host system, and CIM classes within the namespaces; and
the client request is delegated to the corresponding class on the remote host system.

10. A system for providing a homogeneous view of a distributed common information model (CIM) within a heterogeneous virtual system environment, the virtual system environment including a plurality of local and remote host systems, a number of the local and remote host systems each comprising a CIM Object Model (CIMOM) and a CIM repository of provider applications, the system further comprising:
a CIMOM selected from the plurality of local and remote host systems to serve as a single access point to the plurality of CIMOMs within the virtual system environment for all client requests, the client requests originating from a plurality of different distributors; and
provider applications of the selected CIMOM configured to communicate with non-selected CIMOMs in the virtual system environment, the configuring including:
using at least one of a discovery process and a registration process to identify all of the local and remote host systems in the virtual system environment; and
providing access points between the provider applications of the selected CIMOM and the local and remote hosts; and
in response to a client request, the selected CIMOM uses the access points to the local and remote host systems to retrieve, aggregate, and forward the information to a client application of the client request as a homogeneous view;
wherein the provider applications of the single access point CIMOM are configured to further perform: periodically checking the registered remote CIMOMs for continued availability; and removing the access points to the registered remote CIMOMs upon determining that the registered remote CIMOMs are no longer available.

11. The system of claim 10, wherein the discovery process includes:
using a given filter within a subnet of the selected CIMOM, searching for remote CIMOMs in the virtual system environment; and
registering, at the selected CIMOM, remote CIMOMs found as a result of the searching.

12. The system of claim 10, wherein the registration process includes:
receiving a request from a remote CIMOM in the virtual system environment to register with the selected CIMOM within its subnet; and registering, at the selected CIMOM, the remote CIMOM associated with the request.

13. The system of claim 12, wherein the provider applications of the selected CIMOM are configured to further perform:
periodically checking the registered remote CIMOM for continued availability; and
removing the access points to the registered remote CIMOM upon determining that the registered remote CIMOM is no longer available.

14. The system of claim 10, wherein using the access points between the provider applications of the selected CIMOM and the local and remote hosts includes determining whether the client request is for a local CIMOM or a remote CIMOM; wherein client requests for a local CIMOM are executed locally, and client requests for a remote CIMOM are executed using the respective access points.

15. The system of claim 10, wherein:
the access points are newly created CIM namespaces, one namespace for each registered local and remote host system, and CIM classes within the namespaces; and
the client request is delegated to the corresponding class on the remote host system.

* * * * *